United States Patent [19]
Ukai et al.

[11] 3,742,024
[45] June 26, 1973

[54] METHOD OF ESTERIFICATION

[75] Inventors: Tetsuo Ukai; Toshiyuki Mizumoto, both of Ootsu, Japan

[73] Assignee: Toyo Boseki Kabushiki Kaisha, Osaka, Japan

[22] Filed: July 15, 1971

[21] Appl. No.: 163,063

[30] Foreign Application Priority Data
July 24, 1970 Japan.............................. 45/64766

[52] U.S. Cl....... 260/475 P, 260/75 M, 260/475 PR
[51] Int. Cl............................................. C07c 69/82
[58] Field of Search .................. 260/475 P, 475 PR

[56] References Cited
UNITED STATES PATENTS
3,591,625   7/1971   Twilley et al. ................ 260/475 PR Primary Examiner—Lorraine A. Weinberger
Assistant Examiner—E. Jane Skelly
Attorney—E. F. Wenderoth, John T. Fedigan et al.

[57] ABSTRACT

The present invention relates to a method for esterifying an aromatic acid component consisting primarily of terephthalic acid with a glycol component consisting primarily of ethylene glycol which comprises conducting the esterification in the presence of an alkyl amide having a boiling point lower than that of ethylene glycol and represented by the following general formula:

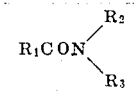

wherein $R_1$ is a hydrogen atom or an alkyl group, each of $R_2$ and $R_3$ is an alkyl group or one of these groups is an alkyl group and the other is a hydrogen atom, or $R_2$ and $R_3$ are polymethylene groups forming a heterocyclic ring together with the nitrogen atom.

4 Claims, No Drawings

METHOD OF ESTERIFICATION

This invention relates to an improved process for the preparation of esters from a benzene dicarboxylic acid component consisting mainly of terephthalic acid and a glycol component consisting mainly of ethylene glycol. More particularly, the present invention relates to a method of esterifying an acid component consisting mainly of terephthalic acid with a glycol component consisting mainly of ethylene glycol to produce the corresponding esters or oligoesters consisting mainly of bis-β-hydroxyethyl terephthalate and/or ethylene terephthalate oligoesters which are valuable intermediates useful for the production of film or fiber forming high molecular weight polyesters having excellent properties, especially high softening points and excellent whiteness.

It is well known that polyethylene terephthalate can be produced by direct esterification of terephthalic acid with ethylene glycol at elevated temperatures followed by polycondensation of the formed ester in the presence of a catalyst under reduced pressure. This method is called as "direct esterification-polycondensation."

However, this process has been proven unsatisfactory especially because a large amount of diethylene glycol is formed as a by-product by the dehydration reaction of ethylene glycol during the esterification of terephthalic acid with ethylene glycol. In the process of the subsequent polycondensation, diethylene glycol is chemically incorporated into the polyester chain to produce a polyester with a low softening point which is generally not suitable for forming films, fibers and other shaped articles.

It has been proposed to add in the esterification reaction system an additive, such as alkali metal salts (Japanese Patent Publication No. 2594/1959), or alkaline earth metals (selected from Mg, Ca and Sr) or their compounds (Japanese Patent Publication No. 12796/1961) in order to prevent the formation of diethylene glycol during the esterification reaction, and consequently to prevent the lowering of the softening point of the polyester subsequently produced. Although these additives have considerable effects on reducing the diethylene glycol formation during the esterification, it is well known that these additives have undesirable effects on the ultimate polyester, that is, they cause discoloration of the polyester during the polycondensation reaction and lower the thermal stability of the resulting polyester. Moreover, these additives are hardly soluble in the high molecular weight polyester and tend to aggregate to form coarse particles which have undesirable effects on the processing and properties of films and fibers formed from such polyester.

Therefore it is an object of this invention to provide an improved process for producing esters of the kind described above which are useful in the production of polyesters having high melting points and which are free from discoloration.

It is another object of this invention to provide an improved method for the direct esterification-polycondensation reaction to produce polyesters having a high melting point and which are free from discoloration.

The other objects of this invention will become apparent from the following description.

The present invention is based on the finding that an alkylamide having a boiling point below that of ethylene glycol inhibits the formation of diethylene glycol during the esterification reaction of terephthalic acid with ethylene glycol, and the polyester thus obtained by the subsequent polycondensation reaction has excellent properties suitable for forming films, fibers and other shaped articles, without the previously mentioned disadvantages such as discoloration of the polyester, aggregation of the metals, and without lowering the thermal stability of the polyester.

Thus, according to the present invention, there is provided an improved process for the esterification of terephthalic acid with ethylene glycol and particularly the preparation of the oligoester of ethylene terephthalate with minimal formation of diethylene glycol and minimal discoloration.

The esterification reaction of the present invention between the acid component (mainly terephthalic acid) and the glycol component (mainly ethylene glycol) is carried out at a temperature of from 200° to 300° C., preferably from 230° to 270° C., at a pressure of from 0 to 20 kg./cm²G, preferably from 3 to 10 kg./cm²G, with a molar ratio of at least 1.05 moles of the glycol component, preferably from 1.2 to 3.0 moles, per mole of acid component, until at least 75 percent, preferably from 80 percent to 90 percent of the acid group of the acid component is esterified.

The important feature of this invention is to conduct the esterification in the presence of a particular alkylamide of a lower aliphatic acid. Thus in the present invention an alkylamide having a boiling point below that of ethylene glycol is employed in amounts of from 0.001 to 1.0 mole percent, preferably from 0.01 to 0.2 mole percent, based on the acid component.

If desired, the esterification reaction in the presence of such alkylamide may be carried out in the presence of the corresponding oligoester as a reaction medium. Thus, in case of a batch esterification process, a portion of the esterification product, oligoester, remains in the reactor as the reaction medium for the next batch. On the other hand, in a continuous process, a portion of the oligomer is recycled to the esterification reactor and the major portion is introduced to the subsequent polycondensation reactor.

The alkylamide to be used in the present invention has a structure represented by the following general formula:

wherein $R_1$ is a hydrogen atom or an alkyl group, each of $R_2$ and $R_3$ is a hydrogen atom or an alkyl group or $R_2$ and $R_3$ may be polymethylene groups forming a heterocyclic ring together with the nitrogen atom. The amides must be those having boiling points lower than the normal boiling point of ethylene glycol.

The preferable amides are, for example, N-methylformamide, N,N-dimethyl-formamide N-ethylformamide, N,N-methylethylformamide, N,N-diethylformamide, N-methylacetamide, N,N-dimethylacetamide, N-ethylacetamide, N,N-methylethylacetamide, N,N-diethylacetamide, N,N-dimethylpropionamide, N,N-methylethylpropionamide and N,N-diethylpropionamide. When the esterification is conducted in the presence of such a low boiling point alkyl amide and the formed ester is subjected to polycondensation, the resulting polyester has excellent qualities such as a high softening point, a high thermal stability, very little discoloration and very little contamination. Also, the thus-produced polyester is in the form of coarse particles. This is due to the fact that the polyester product of the present method contains only a very small residual amount of additive. Thus, after the esterification reaction, the alkylamide having a boiling point below that of ethylene glycol is easily distilled off from the reaction system together with the excess glycol component (ethylene glycol) used in the preceding esterification or the ethylene glycol liberated in the subsequent polycondensation, so that the alkyalmide does not remain in the ultimate polyester.

An alkyl amide having a boiling point above that of the glycol component or ethylene glycol has a similar effect of lowering the formation of diethylene glycol during the esterification, but its use is undesirable because it remains in the final polymer and causes discoloration of the polymer.

The alkyl amide used in this invention may be added to the esterification reaction system in bulk or as an aqueous solution, as an alcohol solution, as an ethylene glycol solution, or the alkyl amide may be dissolved in a suitable solvent and then added to the reaction system.

While the present invention has been described particularly with respect to the polyethylene terephthalate, it may also be applicable to the preparation of copolyesters which mainly (e.g. at least 85 mol %) consist of ethylene terephthalate units. Thus, the ester-forming acid component may contain at least 85 mol % of terephthalic acid and up to 15 mol % of one or more other carboxylic acids such as isophthalic acid, p-oxybenzoic acid, sodium sulfoisophthalic acid, adipic acid, sebacic acid, trimesic acid, trimellitic acid, and 1,4-cyclohexane dicarboxylic acid, Similarly, the ester-forming polyol component may contain up to 15 mol % of propylene glycol, trimethylene glycol, pentaerythritol or 1,4-cyclohexane dimethanol in addition to at least 85 mol % of ethylene glycol.

If desired, any other additives such as titanium oxide, carbon black, or/and stabilizers may be added.

The oligoester product obtained by the esterification of the present invention may be polycondensed under reduced pressure and at high temperatures in the presence of a known catalyst, for example, antimony trioxide, a tungstic acid compound, germanium oxide, and a metal titanyl oxalate to produce a polyester of high quality especially a polyester having a high softening point and excellent whiteness. The polycondensation may be conducted in a well known manner by the use of a polycondensation catalyst (as exemplified above) known in the art for the production of polyesters. For example, the polycondensation may be conducted at a temperature of 200° – 300° C. under an absolute pressure of 0.2 mmHg or lower and in the presence of a catalyst as exemplified above. Usually the reaction is conducted for 0.5 – 5 hours. The polycondensation per se does not constitute a novel feature of this invention.

The polyesters or copolyesters obtained by this invention are useful for forming fibers, films and other shaped articles.

The invention will be illustrated by referring to the following examples wherein all parts are by weight unless otherwise specified. The intrinsic viscosity was measured in a phenol-tetrachloroethane (6:4) solution at 30° C. The percentages of diethylene glycol are expressed as mol % of diethylene glycol in the glycol component of the polymer. The softening point is expressed as the temperature at which the polarized light produced by the stretched polymer disappears when heated on a hot plate. The color of the polymer is expressed as b-value in the Hunter (L, a, b) system measured by a Hunter photoelectric color difference meter in the polymer pellets. The smaller the b-value, the higher the whiteness of the polymer.

The amount of the additives used is represented by mol % based on the acid component.

It should be understood, however, that the following examples are presented by way of illustration only, and are not intended to limit the scope of the invention.

EXAMPLES 1 – 8

400 parts of terephthalic acid, 300 parts of ethylene glycol and a predetermined amount of an alkylamide having a boiling point lower than that of ethylene glycol were charged into an autoclave equipped with an stirrer, a distillation column and pressure regulator, and the esterification reaction was carried out, while removing water liberated by the esterification reaction from the reaction system, at a temperature of 230° C., under a nitrogen pressure of 2.5 kg./cm²G for 2 hours. Then the reaction product was transferred to a polycondensation autoclave, and 0.008 part of potassium titanyloxalate was added and a polycondensation reaction was carried out at 273° C. under a reduced pressure of 0.21 mmHg for 2 hours. The results are indicated in the following Table 1.

For comparison, the esterification reaction was carried out in the same manner as above except that the amide was not used or there was used an alkylamide having a boiling point higher than that of ethylene glycol. The results are also indicated in Table 1.

TABLE 1

| Additive | Amount of addition (mol percent) | Intrinsic viscosity of polymer | Diethylene glycol in polymer (mol percent) | Softening point of polymer (° C.) | Polymer color (b-value) |
|---|---|---|---|---|---|
| Example No.: | | | | | |
| 1 ............ N,N-dimethylformamide | 0.01 | 0.64 | 3.1 | 262.5 | 4.0 |
| 2 ............ do | 0.02 | 0.62 | 2.2 | 264.5 | 3.4 |
| 3 ............ do | 0.05 | 0.63 | 1.8 | 265.5 | 3.6 |
| 4 ............ N,N-dimethylacetamide | 0.02 | 0.63 | 2.1 | 264.8 | 4.2 |
| 5 ............ do | 0.10 | 0.64 | 1.6 | 266.0 | 4.3 |
| 6 ............ N,N-diethylacetamide | 0.02 | 0.65 | 2.8 | 263.8 | 4.3 |
| 7 ............ {N,N-dimethylformamide | 0.02 | | | | |
|  {N,N-dimethylacetamide | 0.01 | 0.64 | 2.1 | 264.5 | 3.8 |
| 8 ............ N-methylformamide | 0.02 | 0.60 | 2.4 | 264.0 | 4.0 |
| Control: | | | | | |
| 1 ............ | | 0.64 | 7.0 | 252.5 | 3.7 |
| 2 ............ N,N diphenylphthalamide | 0.02 | 0.65 | 6.2 | 254.0 | 7.0 |
| 3 ............ N,N,N',N'-tetramethylmalonamide | 0.02 | 0.62 | 3.5 | 260.8 | 5.0 |

EXAMPLES 9 – 16

400 parts of terephthalic acid, 375 parts of ethylene glycol and a predetermined amount of an additive were charged and the esterification reaction was carried out in the same manner as in Example 1.

Then the reaction product was transferred to a polycondensation autoclave and polycondensation was conducted in the same manner as in Example 1 except that 0.05 part of germanium oxide was used as the catalyst. The results are shown in the following Table 2.

formula:

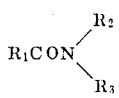

wherein $R_1$ is a hydrogen atom or an alkyl group, each of $R_2$ and $R_3$ is an alkyl group or one of these groups is an alkyl group and the other is a hydrogen atom, or $R_2$ and $R_3$ are polymethylene groups forming a heterocyclic ring together with the nitrogen atom, wherein

TABLE 2

| Additive | Amount of addition (mol percent) | Intrinsic viscosity of polymer | Digethylene glycol in polymer (mol percent) | Softening point of polymer (°C.) | Polymer color (b-value) |
|---|---|---|---|---|---|
| Example No.: | | | | | |
| 9  N,N-diethylformamide | 0.01 | 0.63 | 3.2 | 262.0 | 4.0 |
| 10  do | 0.02 | 0.62 | 2.7 | 263.4 | 3.6 |
| 11  do | 0.10 | 0.64 | 1.5 | 266.5 | 3.5 |
| 12  N,N-dimethylacetamide | 0.02 | 0.62 | 2.1 | 264.8 | 3.8 |
| 13  do | 0.05 | 0.56 | 1.8 | 265.6 | 3.6 |
| 14  N,N-dimethylpropionamide | 0.05 | 0.63 | 1.7 | 265.9 | 3.9 |
| 15  N,N-methylethylacetamide | 0.02 | 0.64 | 2.5 | 263.7 | 3.8 |
| 16  {N,N-dimethylformamide | 0.01 | | | | |
|     {N,N-diethylformamide | 0.03 | 0.65 | 1.7 | 266.0 | 3.7 |
| Control: | | | | | |
| 4 | | 0.64 | 9.0 | 248.0 | 4.5 |
| 5  Adipamide | 0.02 | 0.61 | 3.5 | 261.0 | 4.4 |
| 6  N-methylpyrrolidone | 0.02 | 0.64 | 6.3 | 254.2 | 4.0 |

What is claimed is:

1. A method for the esterification of a carboxylic acid component consisting essentially of at least 85 mol % of terephthalic acid and up to 15 mol % of one or more other carboxylic acids selected from the group consisting of isophthalic acid, p-oxybenzoic acid, sodium sulfoisophthalic acid, adipic acid, sebacic acid, trimesic acid, trimellitic acid and 1,4-cyclohexane dicarboxylic acid and a polyol component consisting essentially of at least 85 mol % of ethylene glycol and up to 15 mol % of a polyol selected from the group consisting of propylene glycol, trimethylene glycol, pentaerythritol and 1,4-cyclohexane dimethanol, which comprises conducting the esterification in the presence of an alkyl amide having a boiling point lower than that of ethylene glycol and represented by the following general formula: the alkylamine is added in an amount of 0.001 to 1.0 mol % based on the acid component.

2. A method for the esterification as claimed in claim 1 wherein the alkyl amide is selected from the group consisting of N-methylformamide, N,N-dimethylformamide, N-ethylformamide, N,N-methylethylformamide, N,N-diethylformamide, N-methylacetamide, N,N-dimethylacetamide, N-ethylacetamide, N,N-methylethylacetamide, N,N-diethylacetamide, N,N-dimethylpropionamide, N,N-methylethylpropionamide and N,N-diethylpropionamide.

3. A method for the esterification as claimed in claim 1 wherein the alkylamide is added in an amount of 0.01 to 0.2 mol % based on the acid component.

4. A method as claimed in claim 1 wherein the esterification is conducted at a temperature of 200° – 300° C. under a pressure of 0 – 20 kg./cm²G.

* * * * *